(No Model.)
J. R. WARREN.
SULKY PLOW.
No. 472,240. Patented Apr. 5, 1892.
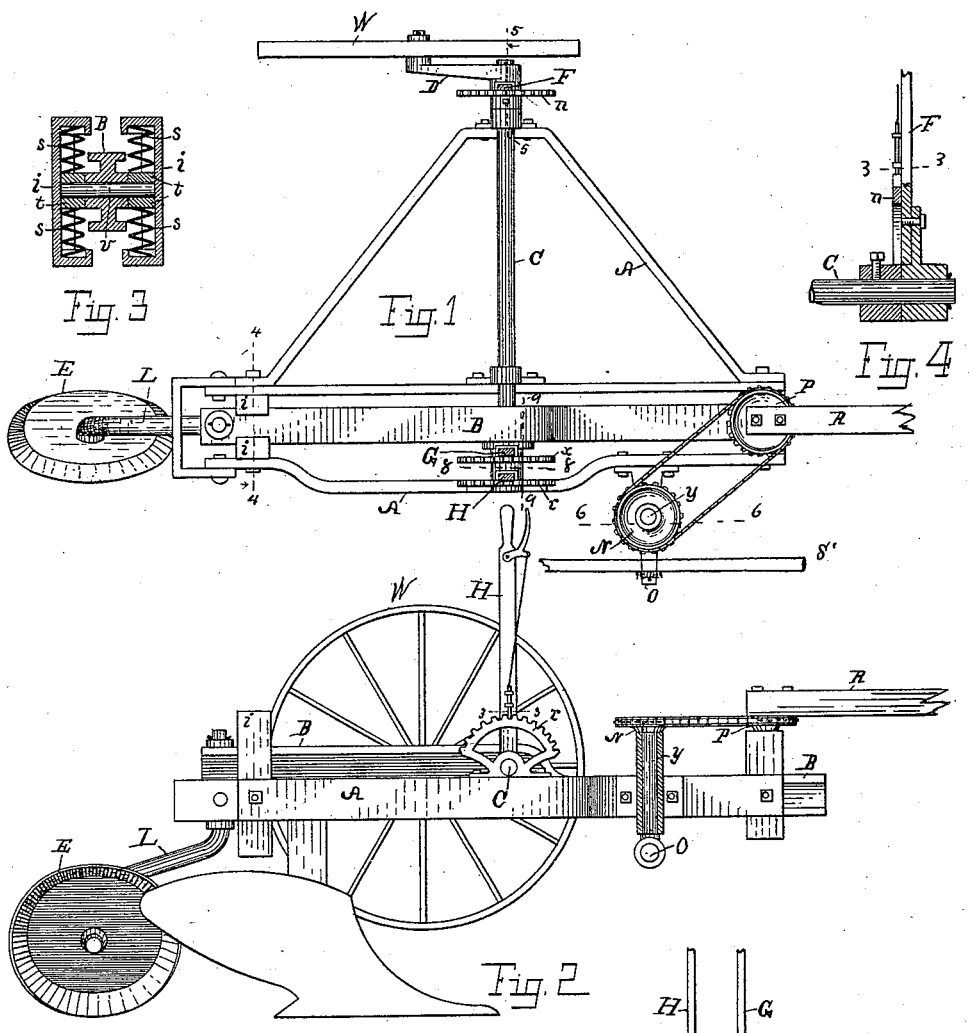
Witnesses:
Walter S. Wood
Edith Perkins
Inventor.
Joel R. Warren
By Lucius C. West
Att'y.

UNITED STATES PATENT OFFICE.

JOEL R. WARREN, OF KALAMAZOO, MICHIGAN.

SULKY-PLOW.

SPECIFICATION forming part of Letters Patent No. 472,240, dated April 5, 1892.

Application filed February 24, 1891. Serial No. 382,537. (No model.)

*To all whom it may concern:*

Be it known that I, JOEL R. WARREN, a citizen of the United States, residing at Kalamazoo, county of Kalamazoo, State of Michigan, have invented new and useful Sulky-Plows, of which the following is a specification.

One of the main objects of this invention consists in the construction by which I am enabled to make the land-wheel and the furrow-wheel both of the same size.

Another object is to have the lever which raises the land-wheel on the right-hand side of the plow, so that the driver can operate said lever with his right hand.

Another object consists in spring-cushioning the plow-beam to receive any shock caused by a plowshare coming in contact with stones, roots, and other obstructions which might cause an upward throw of the plow and create a sudden shock on the frame of plow.

Other objects incidental to the main objects will appear in the following description and claims.

In the drawings forming part of this specification, Figure 1 is a plan view, parts being in section on line 3 3 in Figs. 2, 3, 5, and 6. Fig 2 is a side elevation of Fig. 1, parts being in section on line 6 6 in Fig. 1. Fig. 3 is a section on line 4 4 in Fig. 1. Fig. 4 is a section on line 5 5 in Fig. 1, looking from a point at the right. Fig. 5 is a section on line 9 9 in Figs. 1 and 6, looking from a point at the right. Fig. 6 is a section on line 8 8 in Figs. 1 and 5, looking from a point at the right of the latter-named figure; and Fig. 7 is a view looking from a point at the left of lettered details in Figs. 1 and 2.

Referring to the lettered parts of the drawings, A represents a frame provided with a tongue R at the forward end, caster-wheel E at the rear end, a land-wheel W on the left side, and furrow-wheel S' at the right-hand side, somewhat similar in some respects to those disclosed in prior sulky-plows.

At B is shown the plow-beam extending longitudinally from the front end of the frame A to the rear caster-wheel E, said plow-beam being loosely connected in vertical slide-bearings in the ordinary manner of attaching the forward end of the plow-beam to the ends of the frame, said bearings not being here shown, said beam being attached in slide-bearings to said frame at the rear end, said bearings being spring-cushioned, as hereinafter described. Approximately central between the forward and rear ends of the frame A is mounted in said frame a shaft C, which shaft is transversely to the plow-beam B. The left-hand end of the shaft C is provided with a crank D, the pintle end of which crank constitutes the axis of the land-wheel W. The left-hand end of the shaft C is provided with a ratchet $n$ rigidly attached thereto. Upon the left-hand end of said shaft C, between the ratchet $n$, and the crank D, is mounted a lever F, said lever being provided with a pawl to engage the rod $n$.

The plow-beam B has a transverse opening through it at a point substantially central between its two ends, and through said transverse opening the shaft C is passed, the right-hand end of said shaft having bearings in the side bar of the frame A. Mounted upon said shaft C and located in the transverse opening of the plow-beam is an eccentric I, Figs. 5 and 6. An upwardly-projecting lever G is attached to said eccentric, as shown in said figures. Next to said lever G and outwardly therefrom is an upright lever H, rigidly attached to a collar $z$, which collar is rigidly attached to the shaft C. Projecting upwardly from said collar $z$ is a ratchet $x$, and the pawl of the lever G engages said ratchet $x$.

Projecting upwardly from a side bar of the frame A is a ratchet $r$, and the lever H is provided with a pawl which engages said ratchet $r$.

In the operation of the levers the plow-beam is raised and lowered by means of lever G and its eccentric I, and locked in a position to hold the plow-beam at any desired height by means of its pawl and ratchet, and by means of the right-hand lever H the land-wheel W may be raised and lowered, because by swinging said lever forward and back the crank D at the left-hand end of the shaft C will be swung up or down, which will of course raise or lower said land-wheel. The land-wheel may also be raised and lowered by means of the left-hand lever F, which action will be clearly understood by reference to Figs. 1 and 4. Thus by a proper manipulation of the different levers the height of the land-wheel and the depth of the furrow cut by the plow can be conveniently controlled by the driver whether plowing on level ground or on a hillside.

The rear end of the plow is supported in the frame by a pivot v, each end of said pivot being located in the blocks t, said blocks having slide-bearings in cases i i, said cases being bolted to the bars of the frame opposite to each other, as illustrated in Figs. 1 and 3. Above and below the blocks t and in the cases i are springs s, as shown in Fig. 3. By this means the plow-beam is cushioned to that extent that any sudden jars of the plow-beam caused by the plow coming in contact with obstructions will not be imparted to the frame, and at the same time the plow-beam in being raised can tilt upon said pivot v, which will yield up or down. In the rear end of this spring-cushion the plow-beam is provided with a swiveled pintle L, and the lower end of said pintle bears the caster-wheel E, Figs. 1, 2, and 7. This caster-wheel is pressed out of sheet-steel or other suitable metal in the form of a dish, so that the edges next to the land will be beveled or inclined away from the vertical edge of the land left by turning the furrow therefrom. This caster-wheel runs in the furrow next to the land, and owing to its beveled edge has no undue friction with the land. This caster-wheel, in addition to supporting the rear end of the plow, virtually constitutes a part of the landside of said plow.

The furrow-wheel S is located at the right-hand side of the frame A and a little in the rear of the forward end of said frame, and is supported by an axle O, which axle has an upright portion Y, both pivoted in the casting, which casting projects laterally from the side of said frame. The upper end of the portion Y is provided with a sprocket-wheel N, Figs. 1 and 2.

The tongue R is pivoted to the forward end of the frame so as to swing laterally, and at its point of pivoting said tongue is provided with a sprocket-wheel P, and the two sprocket-wheels P and N carry the sprocket-chain.

By referring to Fig. 1 it will be seen that the sprocket-chain is at an oblique angle to the plow-beam, and the furrow-wheel S is located a little distance from the frame A. By this means I am enabled to use a larger furrow-wheel than ordinary (said wheel being the same size as the land-wheel W) and still be enabled to turn the plow around and not have said furrow-wheel come in contact with the frame, and the plow-frame is more easily kept level and the plow turns easier than would be the case if the furrow-wheel was smaller, as in sulky-plows heretofore described. By means of this sprocket-wheel and chain arrangement, in connection with the tongue and furrow wheel, said furrow-wheel is always kept at a parallel line with the line of draft both in passing across a field and in turning around a corner, from the fact that when the tongue swings laterally said wheel is canted through the medium of sprocket-wheels and chains, which will be readily understood by referring to Figs. 1 and 2.

Having thus described my invention, what I claim as new, and desire to secure by Letters Patent, is—

1. In a sulky-plow, the combination of a frame, a plow-beam having the transverse opening, the land-wheel shaft passing through said opening, an eccentric therein and on said shaft, and the lever attached to said eccentric for raising and lowering the plow-beam, substantially as set forth.

2. The combination of a plow and its frame, and the caster-wheel pressed like a dish and serving the double purpose of caster-wheel and landside, substantially as set forth.

3. In a sulky-plow, the combination of the frame, the cases at rear end of said frame, the sliding blocks and cushioning-springs in said cases, and the plow-beam pivoted to said sliding blocks, substantially as set forth.

4. In a sulky-plow, the combination of a plow-frame, a land-wheel and caster-wheel therefor, a tongue pivoted to the frame, a furrow-wheel pivotally attached to the frame at a point obliquely rearward from the tongue, and the sprocket wheels and chain connecting the swinging-tongue and pivoted furrow-wheel, substantially as set forth.

In testimony to the foregoing I have hereunto subscribed my name in the presence of two witnesses.

JOEL R. WARREN.

Witnesses:
 EDITH PERKINS,
 JAMES BAUMANN.